Patented Nov. 22, 1949

2,488,975

UNITED STATES PATENT OFFICE 2,488,975

ANTIMONYL DERIVATIVES OF POLYHYDRIC PHENOLS AS ANTIOXIDANTS

Byron A. Hunter, Naugatuck, Conn., assignor to United States Rubber Company, New York, N. Y., a corporation of New Jersey No Drawing. Application January 16, 1947, Serial No. 722,467

18 Claims. (Cl. 260—45.75)

This invention relates to a method of retarding the deterioration of organic substances that tend to deteriorate by absorption of oxygen from the air, e. g., natural rubber, synthetic rubbers, petroleum products such as oils and gasoline, non-edible animal fats and oils, unsaturated vegetable oils, natural resins, and synthetic resins, including cellulose derivatives.

According to the present invention there is incorporated in such organic substances that tend to deteriorate when exposed to the atmosphere, an antimonyl derivative of a polyhydric phenol. These antimonyl derivatives of polyhydric phenols may be prepared by the action of antimony trichloride on polyhydric phenols containing an ortho-dihydroxy grouping, e. g., a catechol or a pyrogallol, in the presence of saturated sodium chloride solution, as described in "Organic Derivatives of Antimony" by Walter G. Christiansen (No. 24 in the Monograph Series of the American Chemical Society, published by the Chemical Catalog Co., Inc., New York, 1925), pp. 198 to 203. For example, catechol and antimony trichloride form antimonyl catechol and antimonyl catechol chloride according to the following reaction:

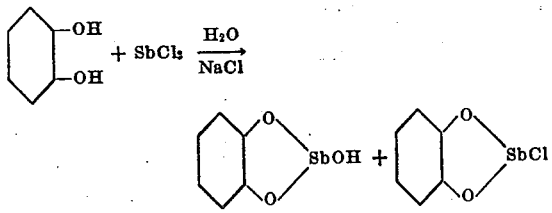

The mixture of the antimonyl catechol and the corresponding antimonyl catechol chloride obtained in the reaction mixture may be completely converted to the chloride by treatment with concentrated hydrochloric acid. Complete conversion to the antimonyl catechol may be achieved by boiling the reaction mixture with water. The benzene ring may also contain alkyl or aryl substituents as shown in the examples below. Examples of antimonyl derivatives of polyhydric phenols containing ortho-dihydroxy grouping that may be used as antioxidants or age resistors according to the present invention are: antimonyl catechol, antimonyl catechol chloride, antimonyl pyrogallol, antimonyl pyrogallol chloride, antimonyl 4-tert.-butyl catechol, antimonyl 4-tert.-butyl catechol chloride, antimonyl 4-tert.-amyl catechol, antimonyl 4-tert.-amyl catechol chloride, antimonyl 4-phenyl catechol, antimonyl 4-phenyl catechol chloride.

The invention is of especial value in the stabilization or preservation of synthetic rubbers, such as polymers of butadienes-1,3 and copolymers of butadienes-1,3 with other polymerizable compounds. Illustrative of polymers of butadienes-1,3 are the polymers of butadiene-1,3, methyl-2-butadiene-1,3 (isoprene), chloro-2-butadiene-1,3 (chloroprene), piperylene, and 2,3-dimethyl-butadiene-1,3. Illustrative of the copolymers of butadienes-1,3 with other polymerizable compounds which are capable of forming copolymers with butadienes-1,3, are copolymers of the above illustrated butadienes-1,3 with up to 70% by weight of the copolymer of compounds which contain a $CH_2=<$ group where at least one of the disconnected valences is attached to an electro-active group, that is, a group which substantially increases the electrical dissymmetry of polar character of the molecule. Examples of such compounds which contain a $CH_2=C<$ group and are copolymerizable with butadienes-1,3 are aryl olefins, such as styrene and vinyl naphthalene, the alphamethylene carboxylic acids, and their esters, nitriles and amides, such as acrylic acid, methyl acrylate, methyl methacrylate, acrylonitrile, methacrylonitrile, methacrylamide; isobutylene, methyl vinyl ether; methyl vinyl ketone; vinylidene chloride. Examples of commercial synthetic rubbers which are polymers of copolymers of butadienes-1,3 as above are neoprene or GR-M rubber (polymerized chloro-2-butadiene-1,3), Buna S or GR-S rubber (copolymer of butadiene-1,3 and styrene), and Buna N or GR-A rubber (copolymer of butadiene and acrylonitrile). The invention is also of especial value in the preservation or stabilization of polyisobutylene (known commercially as Vistanex) and synthetic rubber copolymers of isobutylene with a conjugated diene, for example, copolymers of isobutylene with 1 to 10% by weight of the copolymer of butadiene-1,3 or of isoprene (known commercially as butyl or GR-I rubbers). Other synthetic rubbers, such as organic polysulfide polymers (known commercially as Thiokols), e. g. reaction products of alkali polysulfides with ethylene dichloride and with dichloro ethyl ether, may also be improved by treatment with stabilizers of this invention.

A valuable property of the stabilizers of this invention is their ability to effectively protect synthetic rubbers from the deleterious effects of heat and oxygen without imparting discoloration of compositions containing them. Thus, these stabilizers may be used in white or light-colored synthetic rubber compositions with little or no risk of developing discoloration or staining when such compositions are exposed to heat or light. Another valuable property of the preferred chemicals of this invention is their insolubility in water. These properties make the preferred chemicals of especial value in the stabilization of synthetic rubbers wherein it is desirable to add the stabilizer to the latex before coagulation. Another valuable property of the stabilizers of this invention is their freedom from objectionable odor which would make their incorporation into rubber compositions undesirable.

The stabilizers or antioxidants of this invention may be added to natural or synthetic rubber by incorporation on a mill, by addition to rubber latex before flocculation, or by any other method known to the art. They may be incorporated alone in the rubber or may be admixed with other compounding ingredients such as vulcanizing agents, accelerators, plasticizers, fillers, reinforcing agents, other antioxidants or compounding ingredients. The stabilizer or antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

The following examples are given to illustrate the invention and are not to be construed as limiting thereof (the parts given are by weight):

*Example I*

Commercial GR-S synthetic rubber (copolymer of 75 parts butadiene-1,3 and 25 parts styrene) was mixed with various antimonyl derivatives of polyhydric phenols as follows:

| | A | B | C | D | E | F |
|---|---|---|---|---|---|---|
| GR-S Synthetic Rubber | 100.0 | 100.0 | 100.0 | 100.0 | 100.0 | 100.0 |
| Antimonyl catechol | | 1.5 | | | | |
| Antimonyl catechol chloride | | | 1.5 | | | |
| Antimonyl pyrogallol | | | | 1.5 | | |
| Antimonyl tert.-butyl catechol | | | | | 1.5 | |
| Antimonyl tert.-butyl catechol chloride | | | | | | 1.5 |

The chemicals were added to the synthetic rubber and thoroughly mixed on a rubber mill in the usual manner. The stocks were placed in an oven at 212° F. for 24 hours and were then removed and allowed to cool. The surface of Stock A, containing no chemical, was resinified and cracked easily on bending, whereas stocks B through F were still in good condition and showed no evidence of deterioration. All samples were replaced in the 212° F. oven and examined daily for a period of ten days. Stock A became progressively harder and more brittle and finally was no longer rubber-like. Stocks B through F all remained in good condition, each retaining the appearance of the original unaged copolymer.

*Example II*

A white synthetic rubber master batch was made up according to the following recipe:

| | |
|---|---|
| Commercial GR-S synthetic rubber | 100.0 |
| Coumarone-indene resin | 7.5 |
| Sulfur | 4.0 |
| Zinc oxide | 40.0 |
| Titanium dioxide | 50.0 |
| Clay (Suprex) | 60.0 |
| Magnesia | 5.0 |
| Mineral wax (Sunproof) | 2.0 |
| Bis (benzothiazyl) disulfide (accelerator) | 1.5 |
| Tetramethyl thiuram monosulfide (accelerator) | 0.25 |
| | 270.25 |

Portions of this white stock were mixed on a rubber mill in the usual manner with a number of the chemicals of this invention as shown in the following table:

| | G | H | I | J | K | L |
|---|---|---|---|---|---|---|
| White masterbatch | 270.25 | 270.25 | 270.25 | 270.25 | 270.25 | 270.25 |
| Antimonyl catechol | | 1.5 | | | | |
| Antimonyl catechol chloride | | | 1.5 | | | |
| Antimonyl pyrogallol | | | | 1.5 | | |
| Antimonyl p-tert.-butyl catechol | | | | | 1.5 | |
| Antimonyl p-tert.-butyl catechol chloride | | | | | | 1.5 |

All stocks were placed in molds and cured for 90 minutes at 45 pounds steam pressure. Samples of the resulting stocks were partially coated with white lacquer and mounted for exposure to the action of sunlight. Strips of cotton cloth were placed across part of the unlacquered portion of each sample. The samples were then exposed to the rays of the sun for 20 days. Each of the exposed rubber samples showed little or no discoloration after this treatment and the lacquered portions of each sample, as well as the cotton strips, were not visibly affected. Thus, it is shown that these deterioration inhibitors are non-discoloring and non-staining and are suitable for use in either white or light-colored stocks.

*Example III*

A white natural rubber stock was made up according to the following recipe:

| | M | N |
|---|---|---|
| Pale crepe | 100.0 | 100.0 |
| Zinc oxide | 10.0 | 10.0 |
| Lithopone | 60.0 | 60.0 |
| Calcium carbonate | 60.0 | 60.0 |
| Zinc laurate | 0.5 | 0.5 |
| Sulfur | 3.0 | 3.0 |
| Tetramethyl thiuram monosulfide (accelerator) | 0.15 | 0.15 |
| Antimonyl catechol chloride | | 1.0 |

Stocks M and N mold cured at 30 lbs. steam pressure for 20 minutes. The tensile strengths of each stock were measured both before and after aging for 72 hours in an oxygen bomb at 300 p. s. i. and 158° F. The unaged and aged tensiles were measured in a Scott tensile machine.

|         | Tensile Unaged | Tensile (Aged 72 hours in Oxygen Bomb) |
|---------|----------------|------------------------------------------|
| Stock M | 2,200          | failed                                   |
| Stock N | 2,000          | 1,490                                    |

The antioxidant properties of the stabilizer are clearly shown.

Example IV

In order to show the stabilizing action of the stabilizers of this invention in vegetable oils, several of the stabilizers were added in the amount of 1% to different portions of boiled linseed oil. The several oil samples were poured into shallow dishes and exposed to the atmosphere at normal room temperature and the surface of the oil was examined daily for appearance of a surface film. An untreated sample of the boiled linseed oil was exposed under the same conditions. The following table indicates the time elapsed before the untreated and treated oil samples showed the first indication of surface film.

Time to film formation
Untreated boiled linseed oil_____ 6 days
Boiled linseed oil containing 1% antimonyl p-tert.-butyl catechol_____ 39 days
Boiled linseed oil containing 1% antimonyl p-tert.-butyl catchol chloride _____ No film at 45 days The antioxidant properties of the stabilizers in boiled linseed oil is clearly evident.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of an antimonyl polyhydric phenol containing ortho-dihydroxy grouping.

2. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of an antimonyl pyrogallol.

3. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of an antimonyl pyrogallol.

4. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of antimonyl catechol.

5. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of antimonyl catechol chloride.

6. A method of retarding the deterioration of a rubber selected from the group consisting of natural rubber, and synthetic rubber polymers of material of the group consisting of butadienes-1,3 and mixtures of butadienes-1,3 with compounds which contains a $CH_2=C<$ group and are copolymerizable with butadienes-1,3 which comprises incorporating therein 0.1% to 5% of antimonyl pyrogallol.

7. A composition comprising a rubber selected from the group consisting of natural rubber, and synthetic rubber polymers of material of the group consisting of butadienes-1,3 and mixtures of butadienes-1,3 with compounds which contain a $CH_2=<C$ group and are copolymerizable with butadienes-1,3 and 0.1% to 5% of an antimonyl derivative of a polyhydric phenol containing ortho-dihydroxy grouping.

8. A composition comprising a rubber selected from the group consisting of natural rubber, and synthetic rubber polymers of material of the group consisting of butadienes-1,3 and mixtures of butadienes-1,3 with compounds which contain a $CH_2=C<$ group and are copolymerizable with butadienes-1,3 and 0.1% to 5% of an antimonyl catechol.

9. A composition comprising a rubber selected from the group consisting of natural rubber, and synthetic rubber polymers of material of the group consisting of butadienes-1,3 and mixtures of butadienes-1,3 with compounds which contain a $CH_2=C<$ group and are copolymerizable with butadienes-1,3 and 0.1% to 5% of an antimonyl pyrogallol.

10. A composition comprising a rubber selected from the group consisting of natural rubber, and synthetic rubber polymers of material of the group consisting of butadienes-1,3 and mixtures of butadienes-1,3 with compounds which contain a $CH_2=C<$ group and are copolymerizable with butadienes-1,3 and 0.1% to 5% of antimonyl catechol.

11. A composition comprising a rubber selected from the group consisting of natural rubber, and synthetic rubber polymers of material of the group consisting of butadienes-1,3 and mixtures of butadienes-1,3 with compounds which contain a $CH_2=C<$ group and are copolymerizable with butadienes-1,3 and 0.1% to 5% antimonyl pyrogallol.

12. A composition comprising a rubbery copolymer of butadiene and styrene, and 0.1% to 5% of an antimonyl polyhydric phenol containing ortho-dihydroxy grouping.

13. A composition comprising a rubbery copolymer of butadiene and styrene, and 0.1% to 5% of an antimonyl catechol.

14. A composition comprising a rubbery copolymer of butadiene and styrene, and 0.1% to 5% of an antimonyl pyrogallol.

15. A composition comprising a rubbery copolymer of butadiene and styrene, and 0.1% to 5% of antimonyl catechol.

16. A composition comprising a rubbery copolymer of butadiene and styrene, and 0.1% to 5% of antimonyl pyrogallol.

17. A composition comprising a rubber selected from the group consisting of natural rubber, and synthetic rubber polymers of material of the group consisting of butadienes-1,3 and mixtures of butadienes-1,3 with compounds which contain a $CH_2=C<$ group and are copolymerizable with butadienes-1,3 and 0.1% to 5% of antimonyl catechol chloride.

18. A composition comprising a rubbery copolymer of butadiene and styrene, and 0.1% to 5% of antimonyl catechol chloride.

BYRON A. HUNTER.

REFERENCES CITED

The following references are of record in the file of this patent:

UNITED STATES PATENTS

| Number | Name | Date |
|---|---|---|
| 2,143,941 | Crawford | Jan. 17, 1939 |